United States Patent Office 3,479,677
Patented Nov. 25, 1969

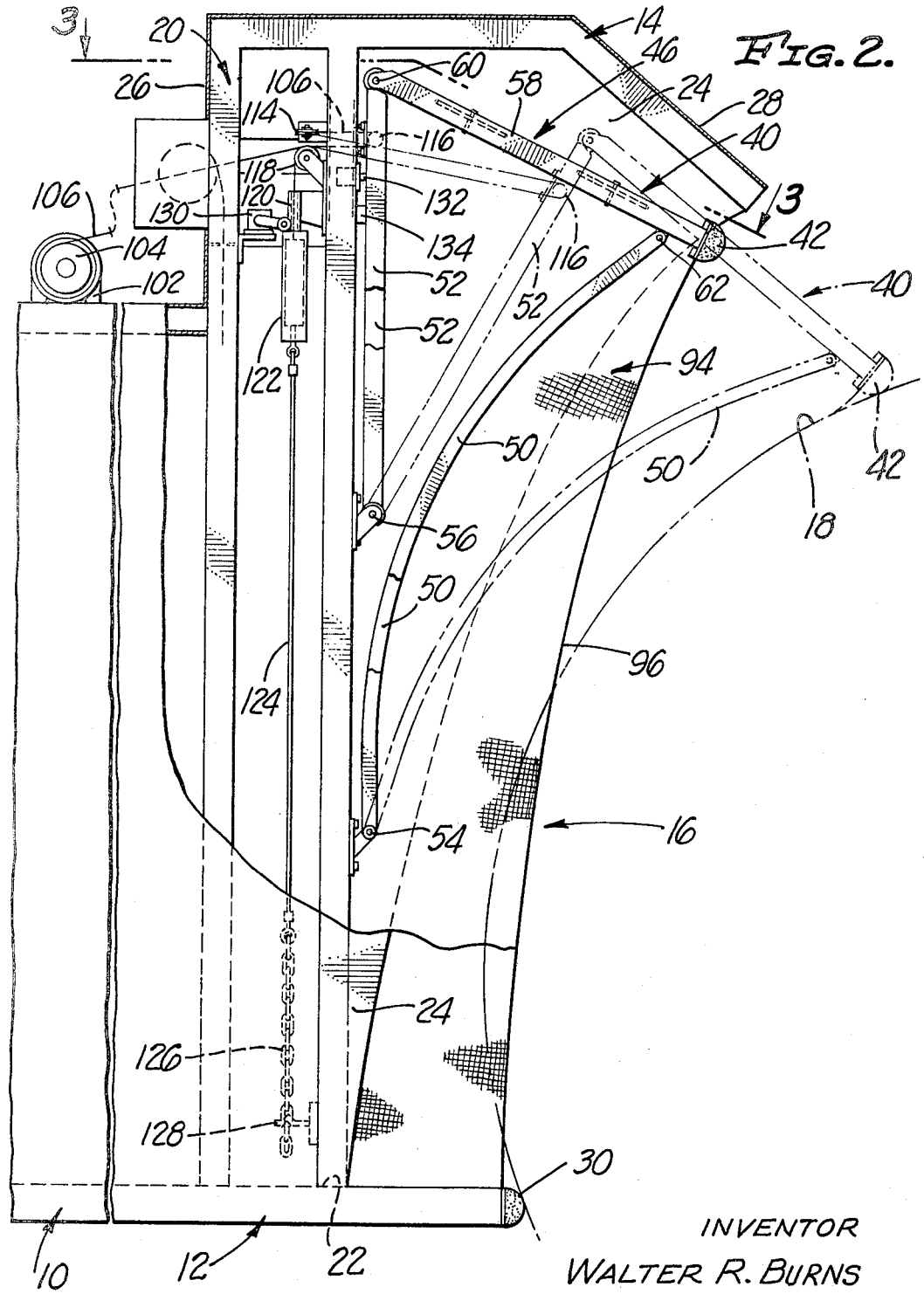

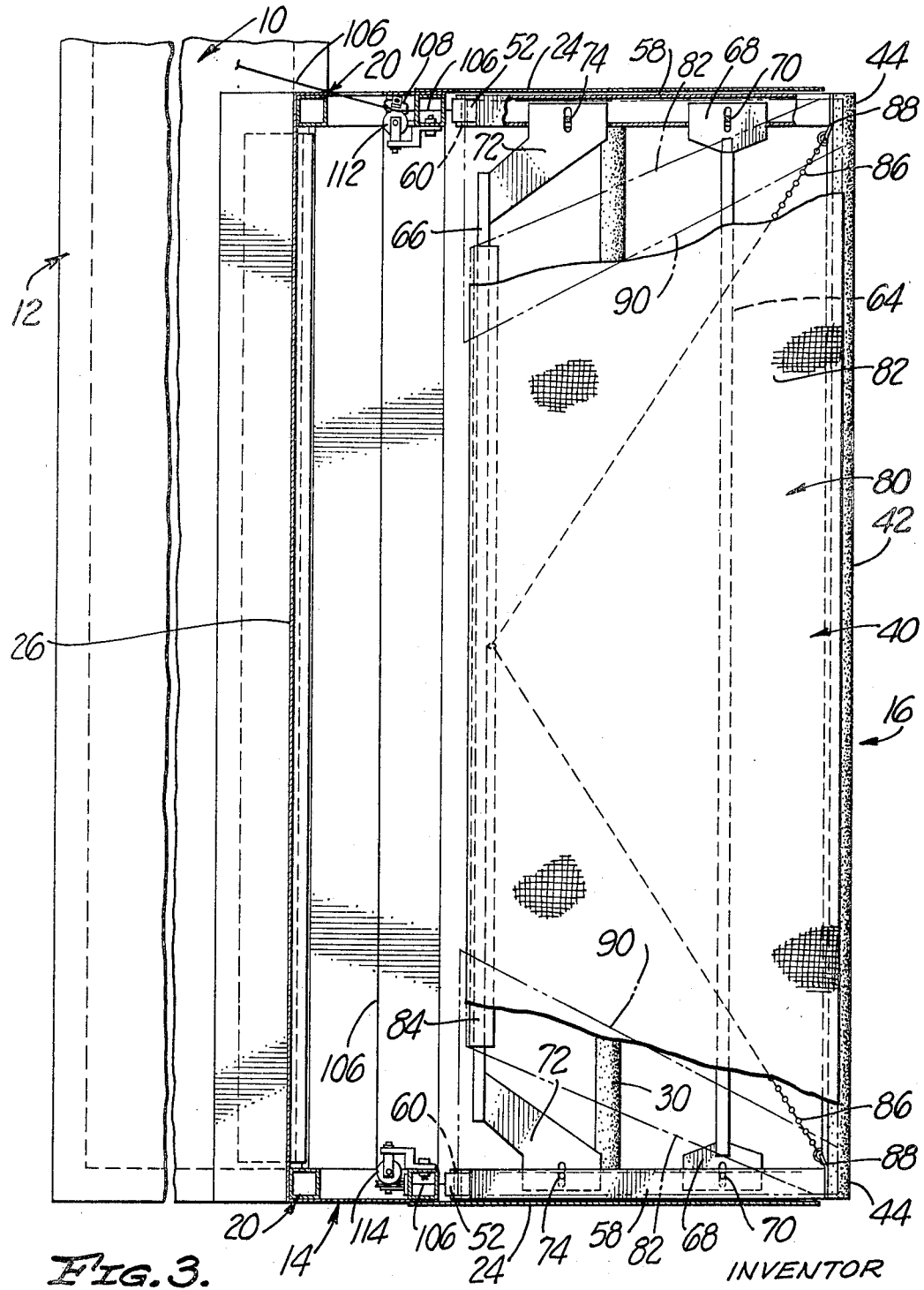

3,479,677
CANOPY FOR AIRPLANE LOADING RAMP
Walter R. Burns, Joshua Tree, Calif., assignor to Stanray Corporation, Chicago, Ill., a corporation of Delaware
Filed Dec. 21, 1967, Ser. No. 692,500
Int. Cl. E04f *10/04;* B63b *27/14*
U.S. Cl. 14—71         8 Claims

ABSTRACT OF THE DISCLOSURE

A passenger loading and unloading ramp for airplanes provided at its outer end with a canopy for covering any space between the outer end of the ramp and a doorway in the fuselage of the airplane with which the ramp is being used. The canopy includes a flexible bumper engageable with the fuselage above the doorway, and includes laterally spaced linkages permitting the ends of the bumper to pivot downwardly and forwardly toward the fuselage independently of each other. With this construction, the bumper can accommodate various airplane fuselage configurations.

BACKGROUND OF INVENTION

The invention relates in general to a passenger loading and unloading ramp for airplanes and, more particularly, to means for providing a substantially weatherproof seal between such a ramp and an airplane with which it is used so that passengers may embark and debark during inclement weather without exposure to the elements.

As background, the invention contemplates a loading and unloading ramp which comprises an enclosed passageway having an inner end in communication with an airport terminal building, or the like, and an outer end registerable with a doorway in the fuselage of an airplane. Thus, embarking and debarking passengers walk through the passageway from the terminal building to the airplane and vice versa. The loading and unloading ramp may be of any of various types. For example, it may be a simple swing-type ramp, a simple extensible ramp, or a ramp which is both extensible and swingable.

It is conventional to provide loading and unloading ramps of the foregoing natural with an outer end having weather sealing means which engages the fuselage of the airplane all the way around the doorway therein through which passengers are to embark or debark. Such a weather sealing means customarily includes upper and lower bumpers engageable with the fuselage above and below the doorway, and side curtains engageable therewith on opposite sides of the doorway.

Since airplane fuselages are externally convex in the vicinities of the doorways therein, and since they frequently have materially different configurations in the vicinities of such doorways, the weather sealing means with which the outer ends of passenger loading and unloading ramps are equipped characteristically contain various flexible and movable parts to accommodate variations in fuselage configurations from airplane to airplane, or from doorway to doorway on the same airplane. However, prior weather sealing means have not been entirely successful in this respect, particularly where large differences in the longitudinal curvatures of the fuselages are encountered from one airplane to another, or from one doorway to another on the same airplane.

SUMMARY AND OBJECTS OF INVENTION

A general object of the invention is to provide a weather sealing means for an airplane loading and unloading ramp which is capable of accommodating a wide range of external fuselage configurations.

More particularly, an important object is to provide a canopy, for covering any space between the outer end of the ramp and the doorway in the airplane fuselage, which is sufficiently flexible that it is capable of engaging portions of the fuselage of the airplane above the doorway therein which are located considerably different distances from the outer end of the ramp.

Still more particularly, another important object of the invention is to provide a canopy which includes a flexible bumper engageable with the fuselage of the airplane above the doorway therein, and which includes means connecting the ends of the bumper to the outer end of the ramp for independent movement of the bumper ends toward and away from the outer end of the ramp, whereby the bumper ends may engage portions of the fuselage of the airplane which are located considerably different distances from the outer end of the ramp.

Another object is to provide flexible side curtains which extend between the canopy at their upper ends and a floor of the ramp at their lower ends, such side curtains accommodating themselves to the curvature of the airplane fuselage in vertical planes on opposite sides of the doorway.

Summarizing the invention, the canopy thereof comprises:

Laterally spaced forward arms having lower ends pivotally connected to the outer end of the ramp;

Laterally spaced rearward arms having lower ends pivotally connected to the outer end of the ramp above the lower ends of the forward arms;

Laterally spaced links respectively having rearward ends pivotally connected to the upper ends of the rearward arms, and respectively having forward ends pivotally connected to the upper ends of the forward arms;

Spaced spreaders extending laterally between the links and pivotally connected at their ends to the respective links;

A flexible bumper extending between and connected at its ends to the forward ends of the links and engageable with the fuselage of the airplane above the doorway therein;

A covering extending laterally between the links and extending forwardly to the flexible bumper to weatherproof any space between the outer end of the ramp and the fuselage of the airplane above the doorway; and Laterally spaced side curtains respectively connected to the links and to the floor of the ramp, and engageable with the fuselage of the airplane on opposite sides of the doorway therein to weatherproof any spaces between the outer end of the ramp and the fuselage of the airplane on opposite sides of the doorway.

The foregoing objects of the invention, and various other objects thereof which will be evident to those skilled in the airplane loading and unloading ramp art in the light of this disclosure, may be acheived with the exemplary embodiment of the invention described in detail hereinafter and illustrated in the accompanying drawings.

DESCRIPTION OF DRAWINGS

In the drawings:

FIG. 2 is a view, partially in vertical section and partially in side elevation, of the outer end of an airplane loading and unloading ramp showing the canopy of the invention thereon; and FIG. 3 is a generally horizontal sectional view taken along the irregular arrowed line 3—3 of FIG. 2.

DESCRIPTION OF PREFERRED EMBODIMENT OF INVENTION

Figure 1:
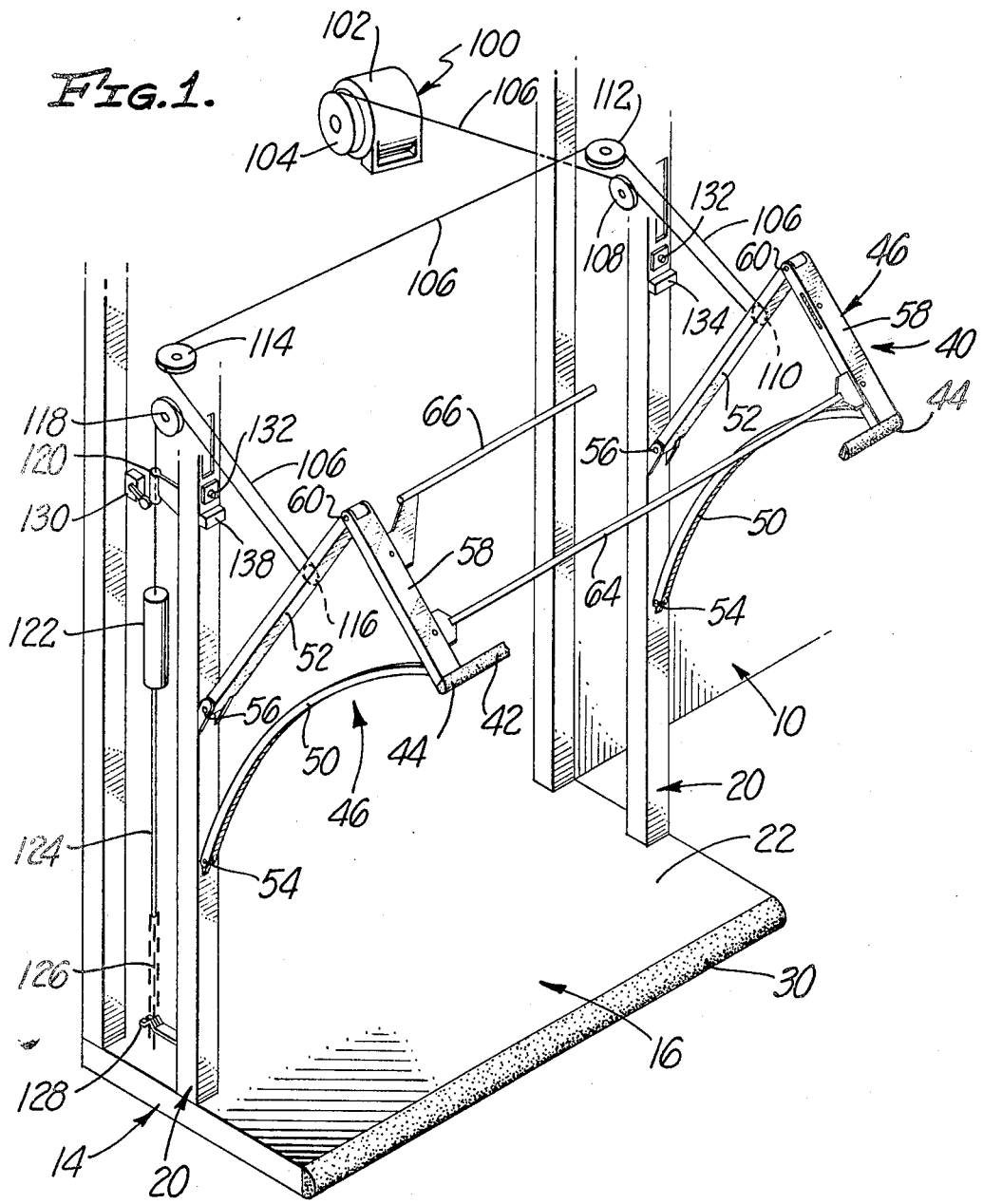
FIG. 1 is a semidiagrammatic perspective view showing a canopy frame of the invention on the outer end of a passenger loading and unloading ramp for airplanes.

Referring to the drawings, shown therein is the outer end 12 of a passenger loading and unloading ramp 10 through which airplane passengers may embark and debark. In the particular exemplary embodiment selected for illustration in the drawings, the ramp 10 is of the simple swing type. However, it will be understood that the invention is not limited thereto and that it may be embodied in any type of passenger loading and unloading ramp for airplanes.

The outer end 12 of the loading and unloading ramp 10 comprises a cab 14 having an open side 16 positionable opposite a doorway, not shown, in the fuselage 18, FIG. 2, of an airplane to be loaded and unloaded. The cab 14 includes a suitable frame 20 which extends upwardly from a floor 22 of the cab and is enclosed by side walls 24, a rear wall 26 and a roof 28.

The floor 22 terminates on the open side 16 of the cab 14 with a suitable lower flexible bumper 30 engageable with the fuselage 18 sufficiently below the doorway therein to make the cab floor substantially flush with the floor of the passenger section of the airplane inside the doorway therein. The lower bumper 30 constitutes no part of the present invention and may be mounted and/or structured as required to conform to different configurations of airplane fuselages below doorways therein.

Since the fuselage of a typical passenger airplane is circular, or substantially circular, in cross section to more efficiently withstand the superatmospheric internal pressures commonly used at altitudes above a few thousand feet, and since the seats for the passengers are located in a horizontal diametral zone of the fuselage for maximum seating space, the floor of the passenger section is generally not much below the horizontal midplane of the fuselage. Thus, the passenger doorway or doorways are customarily formed in convex fuselage portions which slope upwardly away from the open side 16 of the cab 14, as best shown in FIG. 2 of the drawings. Because of this, the cab 14 is preferably provided with a downwardly and forwardly sloping, overhanging roof 28 the terminal edge of which is located in fairly close proximity to the airplane fuselage 18 when the floor bumper 30 is in engagement therewith. Similarly, the side walls 24 of the cab, which extend from the floor 22 to the roof 28, curve upwardly and forwardly from floor to roof to maintain them fairly close to the airplane fuselage. However, the forward edges of the side walls 24 and the roof 28 are set back far enough that there is no danger of their contacting the airplane fuselage and possibly damaging same.

Another characteristic of a typical passenger airplane fuselage is that it is frequently longitudinally convex, as well as transversely convex, above the passenger doorway or doorways therein. Thus, portions of the fuselage 18 above and on opposite sides of the doorway may be located different distances from the open side 16 of the cab.

The present invention provides a canopy 40 under the overhanging roof 28 for covering the space between the open side 16 of the cab 14 and the airplane fuselage 18 above a doorway therein despite variations of the foregoing nature in the fuselage configuration above and on opposite sides of the doorway.

More particularly, the canopy 40 comprises a flexible and resilient bumper 42 engageable with the fuselage 18 of the airplane above the doorway therein with the ends 44 of the bumper located on opposite sides of the doorway. More particularly, the bumper 42 extends laterally substantially the full width of the open side 16 of the cab 14. The bumper 42 is formed of any suitable material which is sufficiently flexible to permit it to engage the fuselage of the airplane above the doorway therein in a weathertight anner along a longitudinal line extending from one side of the doorway to the other, even though the longitudinal configuration of the fuselage may be such as to require the ends of the bumper to be located different distances from the open side 16 of the cab 14. With this in view, the invention provides the canopy 40 with two arm means 46 spaced apart laterally of the open side 16 of the cab 14 and respectively connected at their outer ends to the ends 44 of the bumper 42, the two arm means 46 being independently pivotable, relative to the cab frame 20, downwardly and forwardly toward the fuselage 18 of the airplane. With this construction, the bumper 42 is free to flex sufficiently to maintain the entire length thereof in engagement with the airplane fuselage along a line extending longitudinally of the fuselage above the doorway, even though the longitudinal curvature of the fuselage along such line requires locating the bumper ends 44 considerably different distances from the open side of the cab.

Considering the canopy 40 in more detail, it is provided with a frame which includes the two independently-pivotable arm means 46. As best shown in FIGS. 1 and 2, each of the arm means 46 comprises generally upright forward and rearward arms 50 and 52 which are pivotable downwardly and forwardly, relative to the cab frame 20 at the outer end 12 of the ramp 10, between retracted positions which are shown in solid lines in FIG. 2 and extended positions which are shown in broken lines in FIG. 2 and in solid lines in FIG. 1. When the forward and rearward arms 50 and 52 are in their extended positions, i.e., when they are pivoted downwardly and forwardly, the corresponding bumper end 44 is in engagement with the airplane fuselage 18 above and to one side of the doorway therein.

More specifically, the respective lower ends of the forward and rearward arms 50 and 52 are pivotally connected to the cab frame 20, along one vertical edge of the open side 16 thereof, by vertically spaced pivot means 54 and 56, the pivot means 56 for the lower end of the rearward arm 52 being above the pivot means 54 for the lower end of the forward arm 50. It will be noted that the forward arm 50 of each arm means 46 is provided with a curvature generally conforming to the curvature of the airplane fuselage 18 in cross section. This permits positioning the upper end of the forward arm 50 closer to the airplane fuselage 18 when the arms 50 and 52 are in their extended positions. The rearward arm 52 of each arm means 46 is preferably straight, as shown.

Each arm means 46 further includes a downwardly and forwardly extending link 58 having its rearward end pivotally connected, by a pivot means 60, to the upper end of the rearward arm 52, and having its forward end pivotally connetced, by a pivot means 62, to the upper end of the forward arm 50. The two links 58 of the two independently pivotable arm means 46 have the respective bumper ends 44 suitably connected thereto at their forward ends. Thus, when the arms 50 and 52 of the respective arm means 46 are swung downwardly and forwardly into their extended positions, the bumper ends 44 are brought into engagement with the airplane fuselage 18 above and on opposite sides of the doorway. Because of the fact that the two arm means 46 can pivot independently, the bumper ends 44 may engage fuselage portions which are located different distances from the outer end 12 of the ramp 10, or, more specifically, different distances from corresponding portions of the cab frame 20. The intermediate portions of the bumper 42 flex to conform to the longitudinal curvature of the airplane fuselage 18 between the bumper ends 44, thereby providing weathertight engagement between the bumper and the airplane fuselage throughout the entire length of the bumper.

To brace the two arm means 46 in the lateral direction, i.e., laterally of their direction of pivotal direction, i.e., laterally of their direction of pivotal movement, the links 58 thereof are interconnected by spaced, substantially parallel, front and rear spreaders 64 and 66 in such a manner as to permit independent pivotal movement of the two arm means. More particularly, the front spreader 64 is provided at its ends with slotted plates 68 which extend into the respective links 58 and which are pivotally connected thereto by pins 70. These pins are disposed in the slots in the plates 68, which slots, as best shown in FIG. 3, extend lengthwise of the front spreader 64. Similarly, the rear spreader 66 is provided at its ends with slotted plates 72 extending into the respective links 58 and pivotally connected thereto by pins 74. It will be noted that the rear spreader 66 is rearwardly offset relative to its end plates 72 so as to locate it substantially at the rearward ends of the links 58. The end plates 72 of the rear spreader 66 extend into the links 58, which are tubular, through slots therein which prevent upward and downward movement of the rear spreader relative to the links 58.

As will be apparent, the pin-and-slot connections between the spreaders 64 and 66 and the links 58 permit independent forward and rearward pivotal movement of the two arm means 46 without interference by the spreaders (within the limits imposed by the pin-and-slot connections). Expressed somewhat differently, the forward and rearward arms 50 and 52 pivotally mounted on the cab frame 20, the links 58 pivotally connected to the forward and rearward arms, and the spreaders 64 and 66 with their pin-and-slot connections to the links 58, provide a canopy frame which is sufficiently flexible to permit the flexible bumper 42 carried thereby to conform to any longitudinal curvature of the airplane fuselage 18 along the desired line of engagement above the doorway encompassed by the open side 16 of the cab 14.

The canopy 40 includes a suitable flexible weatherproof covering 80 which extends generally between the links 58 and forwardly to the flexible bumper 42. More particularly, the covering 80 includes a trapezoidal, flexible and resilient, fabric sheet 82 havings its long side substantially equal in length to and suitably secured to the flexible bumper 42. The short side of the fabric sheet 82 is suitably secured to a member 84 telescoped over the rear spreader 66. This member is maintained in position on the rear spreader by diagonal chains 86 having ends secured to the longitudinal midpoint of the member 84 and having their other ends secured to brackets 88 on the forward ends of the links 58.

With the foregoing construction, the trapezoidal fabric sheet 82 can flex, and the member 84 can slide on the rear spreader 66, to permit the desired flexing of the canopy frame enabling the bumper 42 to conform to the longitudinal curvature of the airplane fuselage 18 above the doorway.

Continuing to refer to FIG. 2, the links 58 carry cantilevered metal panels 90 which overlie and overlap the ends of the trapezoidal fabric sheet 82 to complete the covering 80. As will be apparent, the fabric sheet 82 can move relative to the overlying panels 90 as the canopy frame flexes to enable the bumper 42 to conform to any longitudinal curvature of the airplane fuselage 18.

The canopy 40 includes flexible and resilient side curtains 94 suitably connected at their upper ends to the links 58 and at their lower ends to the floor 22, the side curtains having forward edges 96 engageable with and adapted to conform to the cross sectional curvature of the airplane fuselage 18 when the canopy frame is fully extended. Thus, when the bumpers 30 and 42 and the side curtains 94 are in engagement with the airplane fuselage 18 around the doorway therein, a weatherproof seal protecting embarking and debarking passengers from inclement weather is provided.

Since the canopy 40 pivots downwardly and forwardly into engagement with the airplane fuselage 18 around the doorway therein, it is permitted to move from its retracted position, shown in solid lines in FIG. 2, into its extended position, shown in broken lines in FIG. 2 and in solid lines in FIG. 1, under the influence of gravity. With this in mind, the invention provides an actuating means 100 for lowering the canopy 40 into engagement with the airplane fuselage 18, and for lifting the canopy back into its retracted position when it is not in use.

The actuating means 100 includes a reversible electric motor 102 mounted on top of the ramp 10 adjacent its outer end 12 and driving a cable reel 104. One end of a cable 106 is connected to the cable reel 104 and is so routed around pulleys carried by the cab frame 20 and the canopy-frame arms 52 that rotation of the motor 102 in one direction retracts the canopy while rotation of the motor in the opposite direction permits gravity-induced conformance of the canopy to the configuration of the airplane fuselage 18.

More particularly, the cable 106 extends from the reel 104 to and is trained over a generally vertical pulley 108 on the cab frame 20. From the pulley 108, the cable 106 extends to and is trained around a pulley 110 carried by the rearward arm 52 of one of the arm means 46. The cable 106 is then trained around a generally horizontal pulley 112 on the cab frame 20 adjacent the pulley 108. From the pulley 112, the cable 106 extends laterally of the cab 14 to and is trained around a generally horizontal pulley 114 corresponding to the pulley 112. From the pulley 114, the cable extends to and is trained around a pulley 116 on the rearward arm 52 of the other arm means 46, the pulley 116 corresponding to the pulley 110. From the pulley 116, the cable 106 extends to and is trained over a generally vertical pulley 118 on the cab frame 20 adjacent the pulley 114.

From the pulley 118, the cable 106 extends downwardly through a guide 120 and is connected to a member 122 below this guide. Below and connected to the lower end of the member 122 is a cable tensioning device, such as a shock cord 124, and connected to the lower end of the shock cord is a link chain 126 any link of which may be engaged with a bifurcated clip 128 on the cab frame 20 adjacent the floor 22 to adjust the tension in the shock cord.

Considering the operation of the foregoing cable system with particular reference to FIG. 1 of the drawings, if the motor 102 drives the reel 104 in the clockwise direction, the cable 106 is payed out so that the canopy 40 is lowered downwardly and forwardly into engagement with the airplane fuselage, each arm means 46 being movable independently of the other as hereinbefore described. Conversely, upon counterclockwise rotation of the reel 104 by the motor 102, the cable 106 is taken in to retract the canopy 40.

The weight of the canopy constantly tensions the cable 106, for any position of the canopy 40, and stretches the shock cord 124 until the member 122 engages the cable guide 120. Under these conditions, the member 122 closes a normally open switch 130 in circuit with the motor 102 to permit the motor to lower the canopy. However, once the bumper 42 on the canopy 40 has moved into weather sealing engagement with the airplane fuselage 18 above the doorway therein, most of the weight of the canopy is supported by the fuselage, whereupon the shock cord 124 pulls the member 122 downwardly away from the guide 120, thereby permitting the switch 130 to open. This stops the motor 102 to preclude its paying out any more cable 106.

During energization of the motor 102 in the opposite direction to retract the canopy 40, the motor 102 continues to run until both rearward arms 52 of the canopy frame engage and open parallel-connected normally closed limit switches 132 mounted on the cab frame 120 at opposite edges of the open side 16 thereof. Thus, during retraction of the canopy 40, the motor 102 continues to run until both switches 132 have been opened. To prevent overrun damage to the limit switches 132, the rearward arms 52 of the canopy frame are also engageable with positive mechanical stops 134 adjacent the limit switches.

Thus, it will be apparent that the invention provides a flexible canopy 40 capable of deforming in various respects to accommodate a wide variety of fuselage configurations while maintaining weathertight engagement therewith. Particularly, interconnecting the two arm means 46 flexibly in such a manner that these arm means may pivot downwardly and forwardly toward the fuselage of the airplane independently of each other permits the canopy 40 to accommodate fuselages having quite different longitudinal configurations above the doorways therein.

Although an exemplary embodiment of the invention has been disclosed herein for purpose of illustration, it will be understood that various changes, modifications and substitutions may be incorporated in such embodiment without departing from the spirit of the invention as defined by the claims which follow:

I claim as my invention:

1. In a canopy for covering a space between an outer end of an airplane loading and unloading ramp and a doorway in the fuselage of an airplane opposite which the outer end of the ramp is positioned, the combination of:
   (a) a bumper engageable with the fuselage of the airplane above the doorway therein and having laterally spaced ends engageable with the fuselage of the airplane on opposite sides of the doorway;
   (b) laterally spaced pivoted linkage means respectively connected to said ends of said bumper and independently pivotable downwardly and forwardly, relative to the outer end of the ramp, toward the fuselage of the airplane;
   (c) means for pivotally mounting said linkage means on the outer end of the ramp; and
   (d) whereby said ends of said bumper may engage portions of the fuselage of the airplane which are located different distances from the outer end of the ramp.

2. In combination with an airplane loading and unloading ramp having an outer end positionable adjacent the fuselage of an airplane opposite a doorway therein, an enclosure for a space between the outer end of the ramp and the doorway in the fuselage of the airplane, including:
   (a) a bumper engageable with the fuselage of the airplane above the doorway therein and having ends engageable with the fuselage of the airplane on opposite sides of the doorway;
   (b) bumper mounting means connecting said ends of said bumper to said outer end of said ramp for independent movement of said ends of said bumper toward and away from said outer end of said ramp;
   (c) whereby said ends of said bumper may engage portions of the fuselage of the airplane which are located different distances from said outer end of said ramp; and
   (d) laterally spaced side curtains having upper ends connected to said bumper mounting means for movement with said ends of said bumper, respectively.

3. In combination with an airplane loading and unloading ramp having an outer end positionable adjacent the fuselage of an airplane opposite a doorway therein, a canopy for covering a space between the outer end of the ramp and the doorway in the fuselage of the airplane, including:
   (a) laterally spaced forward arms having lower ends pivotally connected to said outer end of said ramp;
   (b) laterally spaced rearward arms having lower ends pivotally connected to said outer end of said ramp above said lower ends of said forward arms;
   (c) laterally spaced links respectively having rearward ends pivotally connected to the upper ends of said rearward arms, and respectively having forward ends pivotally connected to the upper ends of said forward arms; and
   (d) a flexible bumper extending between and connected at its ends to said forward ends of said links and engageable with the fuselage of the airplane above the doorway therein.

4. The combination set forth in claim 3 wherein said canopy includes spaced spreaders extending laterally between said links and pivotally connected at their ends to said links, respectively.

5. The combination set forth in claim 4 wherein said canopy includes a covering extending laterally between said links and extending forwardly to said flexible bumper.

6. The combination set forth in claim 5 wherein said covering includes a flexible sheet connected to said bumper and to one of said spreaders, and includes members connected to said links and overlying said sheet.

7. The combination set forth in claim 6 including laterally spaced side curtains respectively connected to said links and to said outer ends of said ramp, and engageable with the fuselage of the airplane on opposite sides of the doorway therein upon movement of said bumper into engagement with the fuselage of the airplane above the doorway therein.

8. The combination set forth in claim 7 wherein said outer end of said ramp is provided with a downwardly and forwardly sloping, overhanging roof overlying the rearward edge of said covering when said bumper is in engagement with the fuselage of the airplane.

References Cited

UNITED STATES PATENTS

| | | | |
|---|---|---|---|
| 2,581,293 | 1/1952 | Read | 14—72 |
| 2,875,457 | 3/1959 | Read | 14—71 |
| 3,121,243 | 2/1964 | Phillips | 14—71 |
| 3,184,772 | 5/1965 | Moore | 14—71 |
| 3,250,038 | 5/1966 | Steel | 49—388 X |
| 3,310,823 | 3/1967 | Preiss | 14—71 |
| 3,352,314 | 11/1967 | Frommelt | 135—5 |
| 3,363,273 | 1/1968 | Chitwood | 135—5 X |

NILE C. BYERS, Jr., Primary Examiner

U.S. Cl. X.R.

135—5